Dec. 3, 1963    G. L. FLANAGAN    3,112,567
DEVICE FOR SETTING TELESCOPIC GUNSIGHTS
Filed Feb. 16, 1962    2 Sheets-Sheet 1
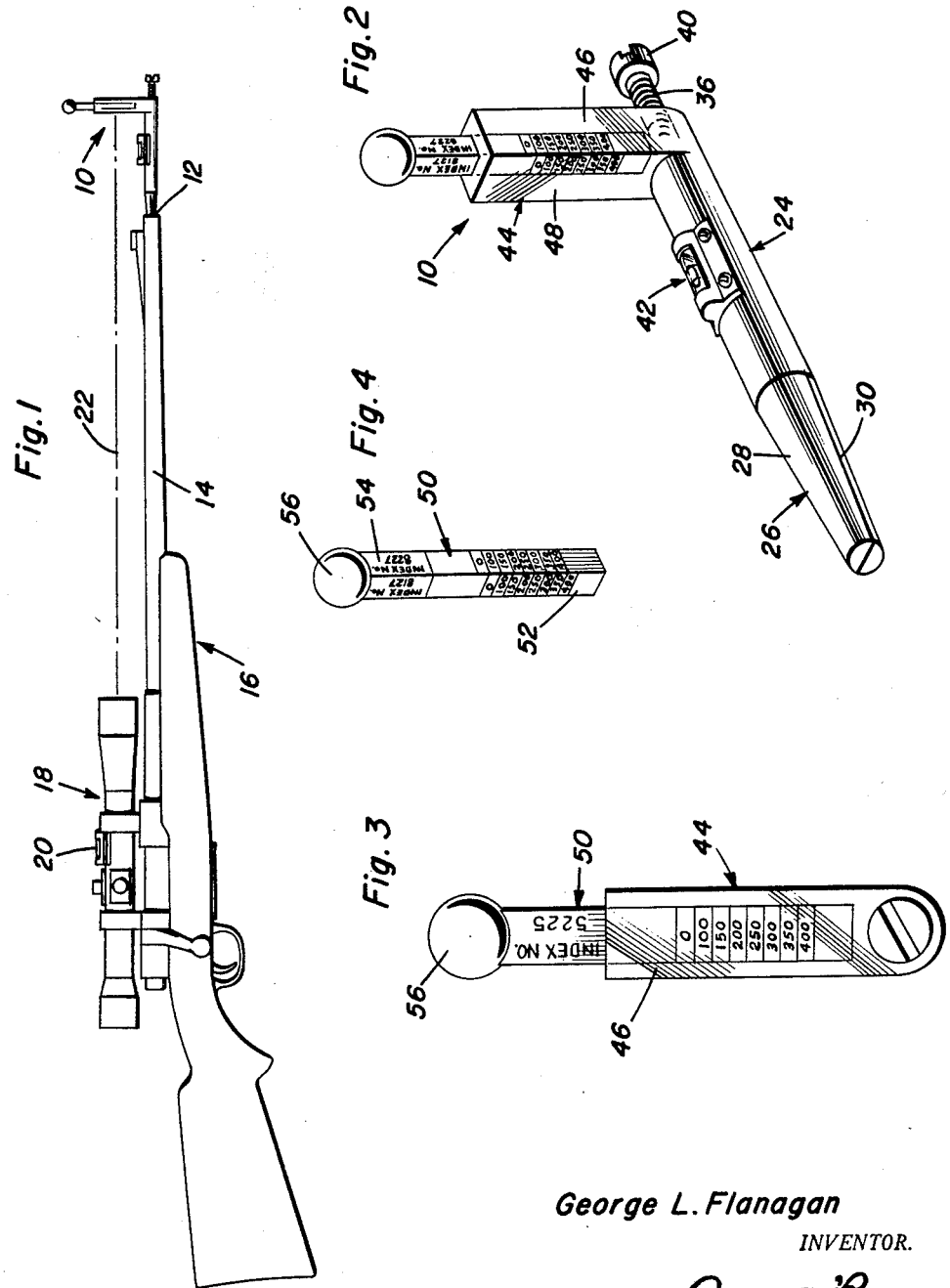
George L. Flanagan
INVENTOR.

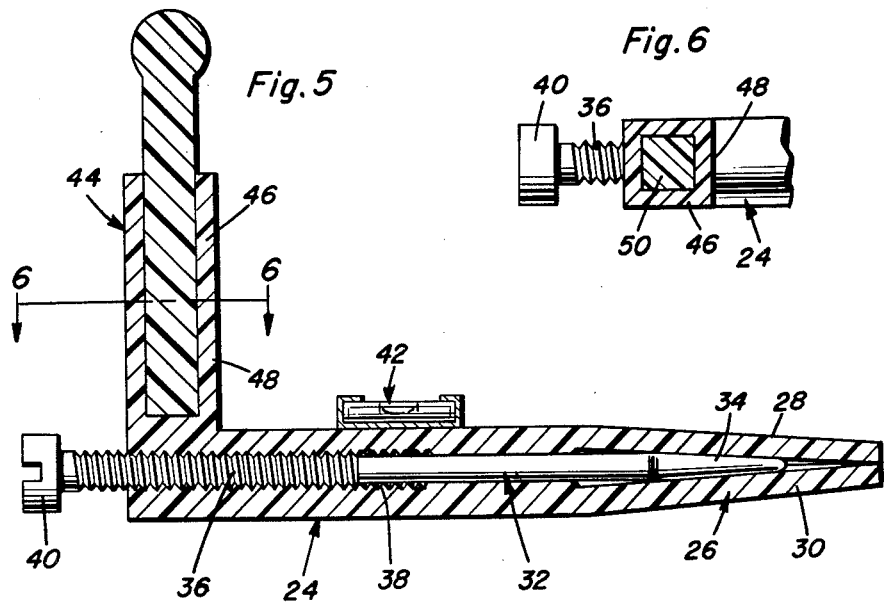
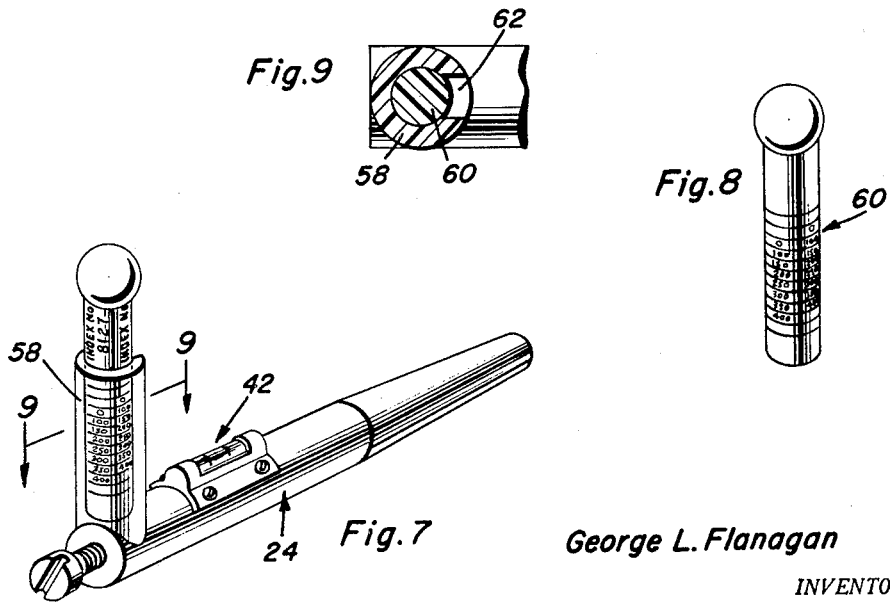
George L. Flanagan
INVENTOR.

United States Patent Office 3,112,567
Patented Dec. 3, 1963

3,112,567
DEVICE FOR SETTING TELESCOPIC GUNSIGHTS
George L. Flanagan, 15 W. 10th St., Kennewick, Wash.
Filed Feb. 16, 1962, Ser. No. 173,721
15 Claims. (Cl. 33—74)

This invention relates to a new and useful device applicable to the barrel of a rifle whereby accurate setting of a telescopic gunsight for the rifle may be facilitated.

The primary object of the present invention is to provide a device which is useful in connection with a wide variety of telescopic gunsights and rifles for quick and accurate optical alinement of the gunsight in accordance with the target range and optical system of the particular rifle and gunsight arrangement.

Another object of the present invention is to provide a device for setting telescopic gunsights of the type removably mounted at the muzzle end of a rifle barrel so as to enable adjustment of a telescope-type gunsight mounted on the rifle by alinement of its optical axis at a desired spacing above the barrel axis in accordance with a desired target range and rifle barrel length, and any ballistic data or target conditions.

In accordance with the foregoing objects, the optical setting device of the present invention includes an elongated tubular mounting member having a bore insert portion which is adjustably expandible into locked engagement with the barrel at the muzzle end thereof for positioning the elongated tubular mounting member in axial alinement with the bore of the barrel. Connected to one end of the elongated tubular mounting member, is a vertical sighting post in the form of a tubular housing within which an angularly repositionable scale bearing member is received so as to expose different scales to the telescope gunsight. The elongated mounting member also includes a level indicating device thereon by means of which the rifle barrel may be horizontally positioned so as to check the level of the telescope gunsight at the same time by means of a level device mounted on the telescope.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a rifle having a telescope gunsight with the optical setting device of the present invention installed.

FIGURE 2 is a perspective view of one form of optical setting device.

FIGURE 3 is a rear elevational view of the optical setting device illustrated in FIGURE 2.

FIGURE 4 is a perspective view of the scale bearing member of the device.

FIGURE 5 is a side sectional view of the optical setting device illustrated in FIGURE 2.

FIGURE 6 is a partial sectional view taken substantially through a plane indicated by section line 6—6 in FIGURE 5.

FIGURE 7 is a perspective view of another form of optical setting device.

FIGURE 8 is a perspective view of the scale bearing member of the second form of optical sighting device.

FIGURE 9 is a partial sectional view taken substantially through a plane indicated by section line 9—9 in FIGURE 7.

Referring now to the drawings in detail, it will be observed that the optical setting device generally referred to by reference numeral 10 in FIGURE 1 is applied to the muzzle end 12 of a barrel 14 associated with the rifle 16 which mounts at its breech end, a telescope sighting device 18 of any form. The telescope gunsight 18 includes a level indicating device 20 by means of which the level position of the telescope device 18 may be determined. Adjustment of the telescope device 18 so as to accurately space the optical axis 22 associated therewith above the axis of the bore of barrel 14, is by determining the intersection of the optical axis 22 with a scale on the optical setting device 10.

Referring now to FIGURES 2 through 6, it will be observed that the optical setting device 10 includes an elongated tubular mounting member generally referred to by reference numeral 24 which may be cylindrical in cross section. Connected to one end of the tubular mounting member 24, is a bore insert portion 26 which includes a pair of split tapered sections 28 and 30 that are radially expandible for engagement with any diameter rifle bore so as to lock the tubular mounting member 24 in axial alinement with the rifle bore.

A lock mechanism generally referred to by reference numeral 32 is therefore provided and extends through the tubular mounting member 24. One end of the locking mechanism 32, is formed as a tapered cam portion 34 that engages the split sections 28 and 30 for radial expansion thereof in response to axial displacement of the lock member 32. Accordingly, the lock member includes an externally threaded portion 36 which threadedly engages an internally threaded portion 38 of the tubular mounting member 24. The externally threaded portion 36 of the locking member 32 projects axially from the mounting member 24 and has connected thereto a head portion 38 by means of which the member 32 may be rotated for axial displacement thereof.

When the tubular mounting member 24 is axially alined with the rifle barrel 14, parallel positioning of the telescope device 18 may be checked by horizontally positioning the rifle barrel 14 by use of the level indicating device 42 of the bubble type which is mounted on the setting device 10. The level indicating device 42 is therefore secured to the elongated mounting member 24 between the bore insert portion 26 and a sighting post assembly generally referred to by reference numeral 44. The sighting post assembly may therefore be formed as an extension of or rigidly connected to that end of the elongated tubular mounting member 24 opposite the bore insert portion 26. The sighting post assembly therefore includes a tubular housing portion 46 which extends perpendicular to the axis of the elongated mounting member 24. The tubular housing 46 may therefore be polygonal in cross section so that one of its sides 48 will be disposed in a plane perpendicular to the optical axis 22 of the telescope gunsight 18 in order to present thereto a scale for aligning the optical axis 22. Thus, the tubular housing or the viewing side 48 thereof may be made of transparent material in order to expose therethrough a scale on scale means comprising a scale bearing member generally referred to by reference numeral 50.

The scale bearing member 50 will therefore have a cross-sectional shape which conforms to the internal cross-sectional shape of the tubular sighting post housing 46 so that the scale bearing member 50 may be slidably received therewithin. Also, the housing 46 receives the scale bearing member 50 in a vertically fixed position rather than being vertically adjustable therewithin. Accordingly, the scale bearing member 50 includes a first portion 52 which is entirely enclosed within the sighting post housing 46 and a second upper portion 54 which is exposed thereabove. Each of the sides of the scale bearing member 50 therefore constitutes a scale bearing face and mounts on the enclosed portion 52, a vertically extending scale which may for example bear indicia corresponding to target ranges. Each side of the scale bearing member 50 therefore also mounts on the exposed portion 54 thereof, labeling information associated with the respective scales on the scale bearing faces. Finally, connected to the top end of the scale bearing member 50, is a knob portion 56 by means of which the scale bearing member 50 may be removed or inserted into the housing 46 and also angularly repositioned so as to expose different scales through the side 48 of the housing 46.

From the foregoing description, it will be apparent that the optical setting device 10 may be easily installed in axial alined position through the bore insert portion 26 and locked in the alined position in a most facile manner by means of the projecting head portion 40 of the lock member 32. Thereafter, the particular telescope sight installation may be accommodated by the selection of the proper scale on the scale bearing member 50 angularly positioned for exposure through the side 48 of the sighting post housing 44 requiring no vertical adjustment of the scale bearing member. The level indicating device 42 may be utilized as hereinbefore indicated for checking the parallel position of the telescope gunsight 18 relative to the rifle bore.

A second form of optical setting device is illustrated in FIGURES 7, 8 and 9. In this form of the invention, the sighting post housing 58 is cylindrical in cross section and accordingly slidably receives a cylindrical scale bearing member 60. It will therefore be appreciated, that in this latter form of the invention, the scale bearing member 60 need only be angularly repositioned without withdrawal of the member 60 in order to expose different vertical scales on the circumferentially spaced scale bearing faces through the sighting post housing 58. Also, the sighting post housing 58 may be provided on the sighting side thereof, with a vertical slot or opening 62 through which the scales on the scale bearing member 60 are exposed to view. The construction and use of the optical setting device in the latter form of the invention is otherwise identical to the optical setting device 10 described with respect to FIGURES 1 through 6.

From the foregoing description, it will be appreciated that the optical setting device of the present invention in addition to being of economical design and construction, is also widely adaptable for rifles and telescopic gunsights of different types so as to render the device more widely useful and furthermore may be applied to the rifle with ease and accuracy.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a rifle barrel mounting an optical sight at a breech end thereof, a device mounted at the muzzle end of the barrel for optical alinement of the optical sight in accordance with the target range and optical system, said device comprising an elongated mounting member having a bore insert portion adapted to be received by said barrel at the muzzle end for adjustable positioning of the mounting member into axial alinement with the barrel, locking means operatively mounted by said mounting member and projecting therefrom opposite said bore insert portion for locking the bore insert portion to the barrel in an adjusted axially alined position of the mounting member, a sighting post fixedly mounted on said mounting member and projecting perpendicular therefrom to intersect the optical axis of said optical sight, and scale means having spaced scale bearing faces receivable within said sighting post in a vertically fixed position and repositionable for selective exposure of one of said faces to the optical sight, said spaced scale bearing faces mounting different scales with respect to which the optical axis is adjusted.

2. The combination of claim 1, including level indicating means mounted on said elongated mounting member between the bore insert portion and the sighting post.

3. The combination of claim 2, wherein said elongated mounting member comprises a tubular element having a split tapered end section forming said bore insert portion.

4. The combination of claim 3, wherein said lock means comprises an elongated shaft member having a tapered end portion received within said bore insert portion of the elongated mounting member for radial expansion thereof in response to axial displacement of the shaft member, said shaft member further including a threaded portion threadedly engageable with the elongated mounting member for axial displacement when rotated, and means for rotating said shaft member connected to an end thereof projecting from the elongated mounting member.

5. The combination of claim 4 wherein said sighting post means comprises a tubular housing slidably receiving said scale means, one side of said tubular housing exposing a portion of said scale means to view.

6. The combination of claim 5, wherein said scale means comprises a scale bearing member having a first portion slidably received by said sighting post and mounting said spaced scale bearing faces, and a second portion projecting therefrom, said scale bearing member being angularly repositionable within the sighting post means for exposing to view said different scales on the scale bearing faces.

7. The combination of claim 1, wherein said elongated mounting member comprises a tubular element having a split tapered end section forming said bore insert portion.

8. The combination of claim 1, wherein said lock means comprises an elongated shaft member having a tapered end portion received within said bore insert portion of the elongated mounting member for radial expansion thereof in response to axial displacement of the shaft member, said shaft member further including a threaded portion threadedly engageable with the elongated mounting member for axial displacement when rotated, and means for rotating said shaft member connected to an end thereof projecting from the elongated mounting member.

9. The combination of claim 1 wherein said sighting post means comprises a tubular housing slidably receiving said scale means, one side of said tubular housing exposing a portion of said scale means to view.

10. The combination of claim 9 wherein said tubular housing is made of transparent material and is polygonal in cross section to define said one side disposed in a plane perpendicular to the optical axis of the optical sight.

11. The combination of claim 1, wherein said scale means comprises a scale bearing member having a first portion slidably received by said sighting post and mounting said spaced scale bearing faces, and a second portion projecting therefrom, said scale bearing member being angularly repositionable within the sighting post means for exposing to view said different scales on the scale bearing faces.

12. The combination of claim 11 wherein said scale bearing member is cylindrical in cross section for exposing one scale through a vertical slot formed in the sighting post means.

13. A device for setting telescopic gunsights comprising an elongated mounting member having a bore insert portion adapted to be received at a muzzle end of a gun barrel for adjustable positioning of the mounting member into axial alinement with the barrel, locking means operatively mounted by said mounting member and projecting therefrom opposite said bore insert portion for locking the bore insert portion to the barrel in an adjusted axially alined position of the mounting member, a sighting post fixedly mounted by said mounting member and projecting perpendicular therefrom, and scale means having spaced scale bearing faces receivable within said sighting post in a vertically fixed position and repositionable for selective exposure of one of said faces to the optical sight, said spaced scale bearing faces mounting different scales with respect to which the optical axis is adjusted.

14. The combination of claim 13 wherein said sighting post comprises a tubular housing slidably receiving said scale means, one side of said tubular housing exposing a portion of said scale means to view.

15. The combination of claim 14, wherein said scale means comprises a scale bearing member having a first portion slidably received by said sighting post and mounting said spaced scale bearing faces, and a second portion projecting therefrom, said scale bearing member being angularly repositioned within the sighting post means for exposing to view said different scales on the scale bearing faces.

No references cited.